L. H. ROUVIERE.
AUTOMATIC HORSE LEADER AND BACKER.
APPLICATION FILED MAR. 13, 1909.
945,285.
Patented Jan. 4, 1910.
2 SHEETS—SHEET 1.
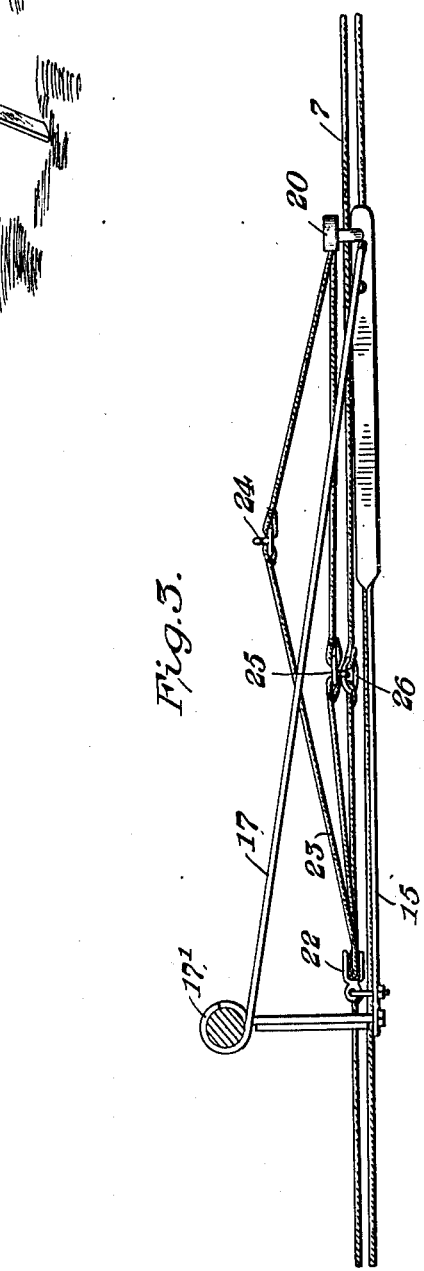
Witnesses
Inventor
L. H. Rouviere,
By
Attorneys.

L. H. ROUVIERE.
AUTOMATIC HORSE LEADER AND BACKER.
APPLICATION FILED MAR. 13, 1909.

945,285.

Patented Jan. 4, 1910.
2 SHEETS—SHEET 2.

Witnesses
J. M. Fallin
W. T. Woodson

Inventor
L. H. Rouviere,
By
Attorneys.

UNITED STATES PATENT OFFICE.

LOUIS H. ROUVIERE, OF GUNNISON, COLORADO.

AUTOMATIC HORSE LEADER AND BACKER.

945,285.  Specification of Letters Patent. Patented Jan. 4, 1910.

Application filed March 13, 1909. Serial No. 483,238.

*To all whom it may concern:*

Be it known that I, LOUIS H. ROUVIERE, citizen of the United States, residing at Gunnison, in the county of Gunnison and State of Colorado, have invented certain new and useful Improvements in Automatic Horse Leaders and Backers, of which the following is a specification.

This invention relates to devices for guiding or leading horses and other draft animals when working in a beaten path, as for instance, where operating hay stackers, elevating machinery, pile drivers and similar devices.

The object of the invention is to provide a comparatively simple and thoroughly efficient device of the character described, that will give the operator full control over the draft animal, when the latter is traveling either backward or forward over a predetermined stretch of ground.

A further object is to provide a guiding or leading attachment, including a support having a guiding member or cable secured thereto and operatively connected with the bit of the draft animal and also to a longitudinally disposed bar carried by the hames, whereby the forward or backward movement of the draft animal will exert a pull on the bit, and thus tend to lead the horse in the proper direction.

Further objects and advantages will appear in the following description, it being understood that various changes in form, proportions and minor details of construction may be resorted to within the scope of the appended claims.

Figure 2:
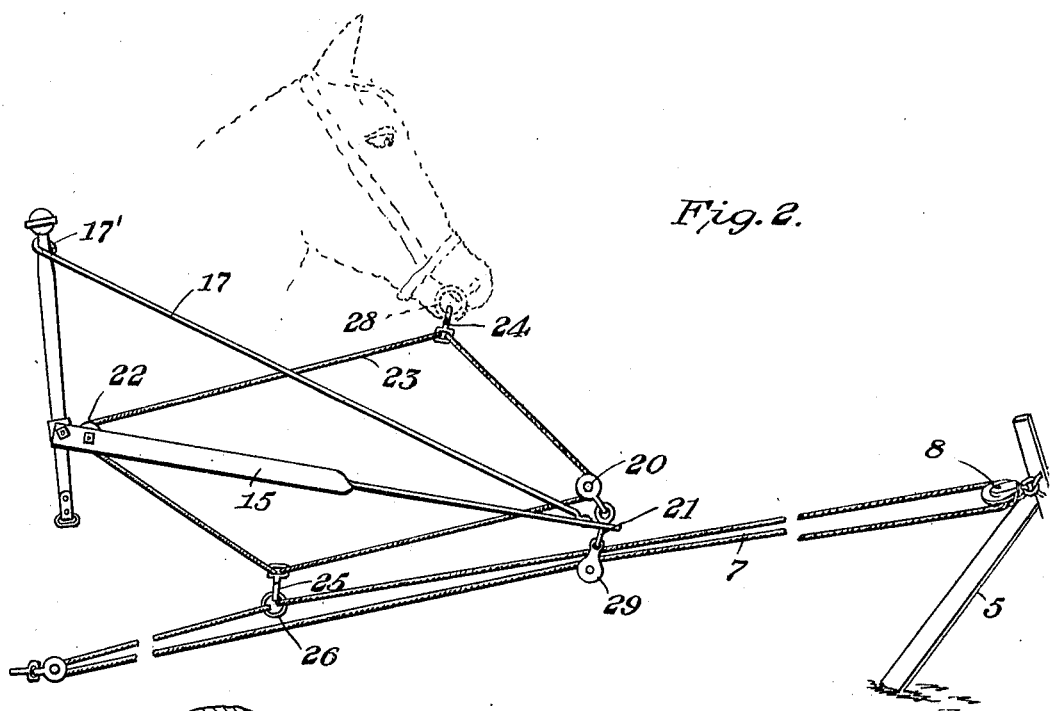
Figure 4:
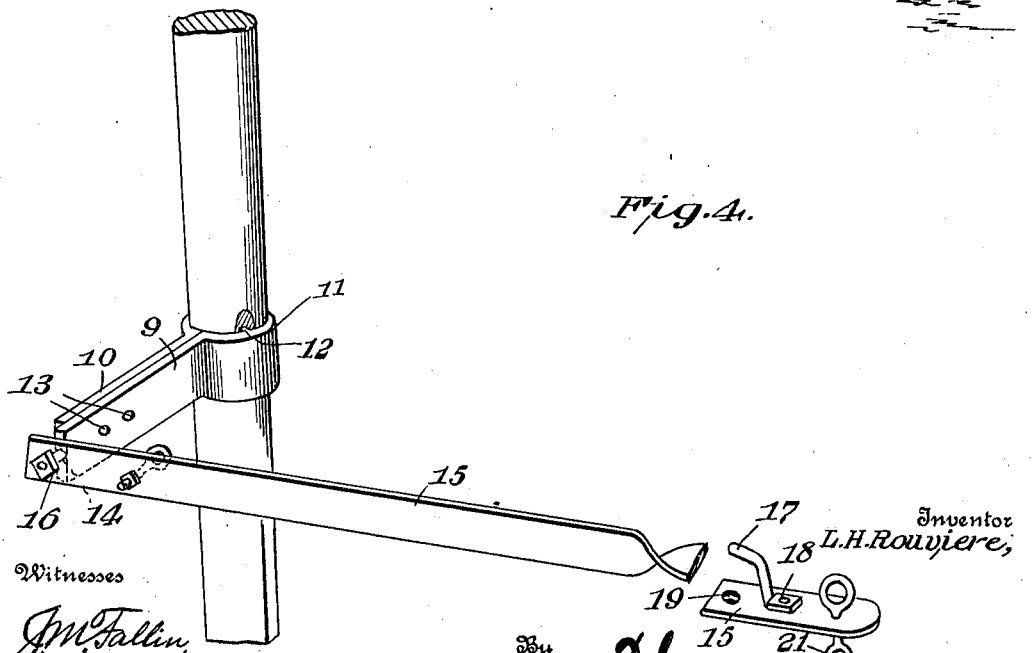

For a full understanding of the invention and the merits thereof, and to acquire a knowledge of the details of construction, reference is to be had to the following description and accompanying drawings, in which:

Figure 1 is a perspective view of the improved guiding and leading device for draft animals; Fig. 2 is an enlarged detail perspective view of a portion of the same; Fig. 3 is a top plan view partly in section, the adjacent ends of the guiding member or cable being broken away to more clearly show the construction of the same; and, Fig. 4 is a detail perspective view of a portion of the hames, showing the manner of attaching the draft bar and supporting clips in position thereon.

Corresponding and like parts are referred to in the following description and indicated in all the views of the drawings by the same reference characters.

The device comprises spaced uprights or supports, preferably formed of intersecting members 5 to which are secured cables or similar anchoring devices 6, said members forming an anchorage for a guiding member, preferably in the form of an endless cable 7. Secured to the intersecting supports 5 are pulleys 8 which receive a cable 7 so that the latter is free to rotate between the spaced supports, for the purpose hereinafter referred to.

Secured to the hames of the draft animal, are spaced plates 9 and 10, one of which is curved laterally at 11 to conform to the shape of the hames, and is provided with a transverse locking lip 12 to assist in preventing accidental displacement of said plate. The mating plate 10 is disposed in the rear of the plate 9, and is rigidly combined therewith by bolts or similar fastening devices 13. The free end of the plate 9 is provided with a threaded extension or bolt 14 which forms a support for a longitudinally disposed bar 15, the latter being preferably in the form of a flat strip of metal having its forward portion disposed in a horizontal plane, and its rear portion given a quarter twist so that the fixed end thereof may be clamped in engagement with the adjacent ends of the plates 9 and 10 by the clamping nut 16.

As a means for supporting the free end of the bar 15, there is provided an inclined brace or rod 17, the upper end of which is provided with a terminal hook 17' for engagement with the top of the hames, while the lower end thereof is bent laterally to form a perforated ear 18 adapted to bear against the flat upper surface of the horizontal portion of the bar 15. The horizontal portion of the bar 15 is provided with one or more openings 19 adapted to register with the perforations in the ear 18 of the inclined brace or rod 17 for the reception of a bolt or similar fastening device, whereby the bar 15 may be supported at any angle or inclination with respect to the surface of the ground.

Journaled on the free end of the bar 15 is a pulley or roller 20, the shank of which extends through said bar and terminates in a snap hook 21, there being a similar pulley or roller 22 mounted on the opposite or fixed end of the bar 15 for engagement with a draft cable 23. The draft cable 23 extends over the pulleys or rollers 20 and 22, and is provided with oppositely disposed snap hooks 24 and 25, one of which is detachably secured to a ring 26 carried by the endless cable 7, while the other is attached to a similar ring 28 mounted on the bit chain of the animal, as shown.

The snap hook 21 forms a support for a sheave or pulley 29, which latter engages the strands of the endless cable 7 and forms a guide for the draft animal. Thus it will be seen that if the draft animal is traveling in a forward direction, the bar 15 will exert a longitudinal pull on the draft cable 23 and tend to guide or lead the animal and compel it to walk in a well-defined or beaten path. When the draft animal is traveling in a rearward direction, the pressure exerted on the cable 23 by the pulley 22 will exert a corresponding pull on the bit, and thus lead the horse in the manner before stated. Attention is here called to the fact that by reason of the connection between the snap 24 and ring 25 of the cable 7, a longitudinal movement exerted on the bar 15 will also impart a corresponding movement to the cable 7 and thus cause it to rotate on the pulleys 8. Should the animal have a tendency to balk, a slight longitudinal pull exerted on either leg of the cable 7 will have the effect of causing the animal to start forward or rearward again, without further attention on the part of the operator. The anchoring cables 6 are preferably provided with cleats or take-up devices 27 so that by adjusting said cleats longitudinally of the anchoring cables, the endless cable 7 may be tightened thereby to regulate the pull on the draft animal in either direction, as the operator may desire.

Having thus described the invention, what is claimed as new is:—

1. A guiding attachment for draft animals, including a support, a guiding member secured to the support cable, a longitudinal bar having means at one end for attachment to the hames of the draft animal and provided at its opposite end with means for sliding engagement with the guiding member, and a draft cable operatively connected with the opposite ends of the bar for attachment to the bit.

2. A guiding attachment for draft animals, including spaced supports, a guiding member carried by the supports, a longitudinal bar having one end thereof adapted to be attached to the hames of the draft animal and provided at its opposite end with means for sliding engagement with the guiding member, pulleys secured at opposite ends of the longitudinal bar, and a draft cable secured to the endless cable and extending over the pulleys for attachment to the bit.

3. A guiding attachment for draft animals, including an endless cable, a longitudinal bar adapted to be attached to the hames of the draft animal, pulleys journaled on the opposite ends of the longitudinal bar, one of said pulleys being provided with a shank carrying a snap hook, a sheave detachably secured to the snap hook and engaging the endless cable, and a draft cable secured to the endless cable and extended over the pulleys on the opposite ends of the bar for attachment to the bit.

4. A guiding attachment for draft animals, including spaced supports, an endless cable carried by the supports and provided with a ring, a longitudinally disposed bar having means at one end thereof for attachment to the hames of the draft animal and provided at its opposite end with means for sliding engagement with the endless cable, pulleys journaled on the opposite ends of the longitudinal bar, a draft cable extending over said pulleys, a snap hook secured to one portion of the draft cable for engagement with the ring of the endless cable, and a snap hook secured to another portion of the draft cable for engagement with the bit.

5. A guiding attachment for draft animals, including a support, a guiding member secured to the support, a plate adapted to be attached to the hames of the draft animal, a longitudinally disposed bar secured to said plate and provided with means for sliding engagement with the guiding member, a brace extending from the free end of the bar to the upper portion of the hames, pulleys journaled on the opposite ends of the bar, and a draft cable secured to the guiding member and extending over said pulleys for attachment to the bit.

6. A guiding attachment for draft animals, including spaced supports having pulleys secured thereto, an endless cable operating on said pulleys, a longitudinally disposed bar having means at one end thereof for attachment to the hames and provided at its opposite end with means for sliding engagement with the endless cable, an inclined brace connecting the free end of the bar and the upper end of the hames, pulleys journaled on the opposite ends of the longitudinal bar, and a draft cable extending over said pulleys and having one portion thereof fixed to the cable and a diametrically opposite portion thereof attached to the bit of said draft animal.

7. A guiding attachment for draft animals, including spaced supports, an endless cable carried by said supports, spaced plates adapted to be attached to the hames of the draft animal, one of said plates being provided with a threaded extension, a longitudinally disposed bar having one end thereof arranged in a horizontal plane and its opposite end disposed in a vertical plane and provided with means for sliding engagement with the endless cable and provided with a perforation for the end of the threaded extension, rollers journaled on the opposite ends of the bar, a draft cable secured to the endless cable and passing over the rollers for attachment to the bit of the draft animal, and a clamping nut engaging the threaded extension and bearing against the longitudinally disposed bar.

8. A guiding attachment for draft animals, including spaced supports, a guiding member extending between said supports, a longitudinally disposed bar one end of which is adapted to be attached to the hames of the draft animal, and having its opposite end disposed in a horizontal plane and provided with a series of perforations, a pulley depending from the perforated end of the bar for engagement with the guiding member, an inclined brace having one end thereof secured to the hames and its opposite end provided with a laterally extending perforated lip arranged to register with the openings in the free end of the bar, rollers secured to the opposite ends of the bar, a draft cable having an intermediate portion thereof secured to the endless cable and thence extended over the rollers for attachment to the bit of the animal, and a fastening device extending through the perforation in the lip and perforation in the longitudinal bar for clamping the members in adjusted position.

In testimony whereof I affix my signature in presence of two witnesses.

LOUIS H. ROUVIERE. [L. S.]

Witnesses:
JOSEPH F. HEINER,
ALFRED WOOD.